Jan. 17, 1933.   M. D. DORSEY   1,894,482
LUGGAGE CARRIER
Filed May 8, 1929   2 Sheets-Sheet 2
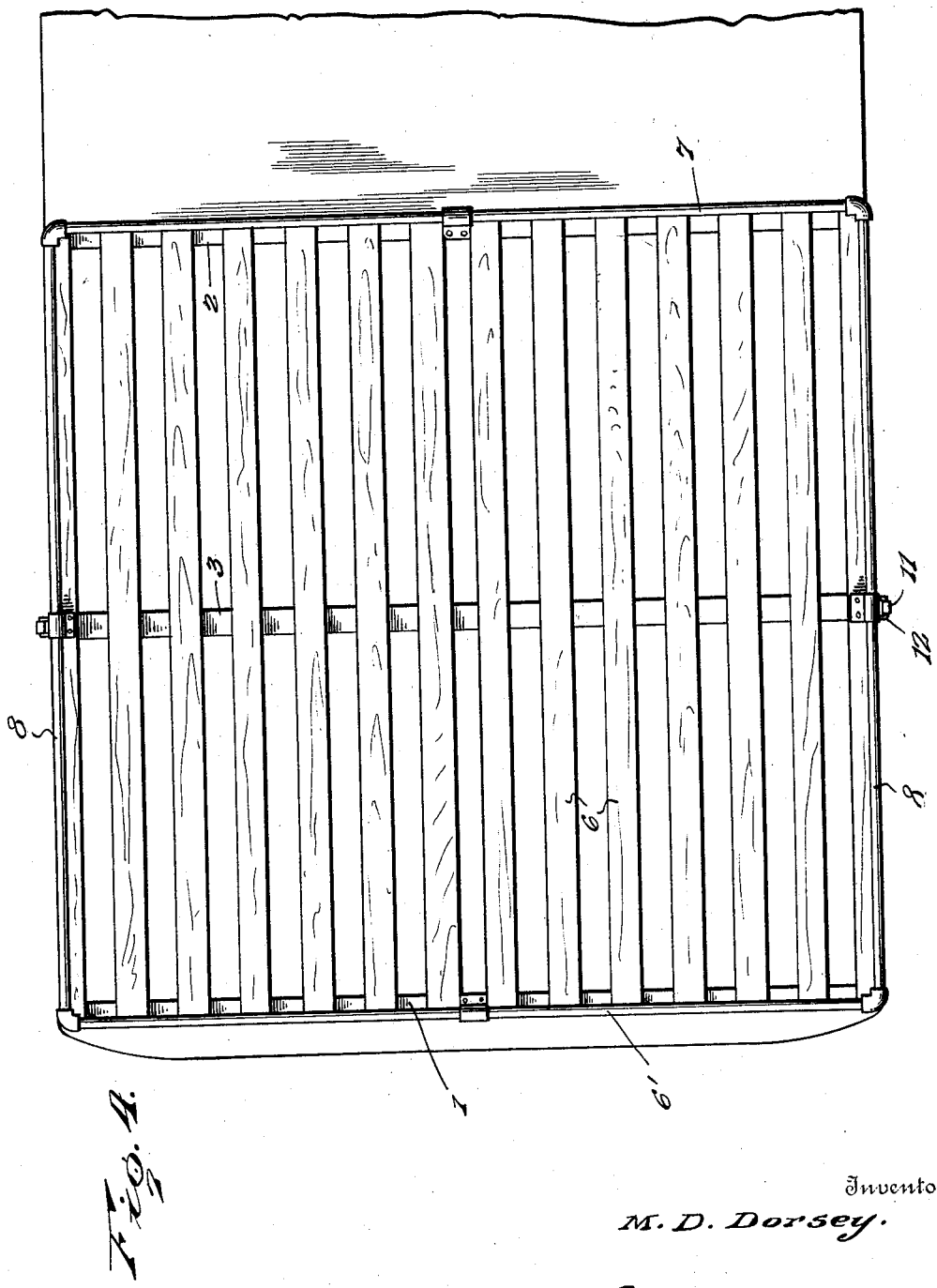

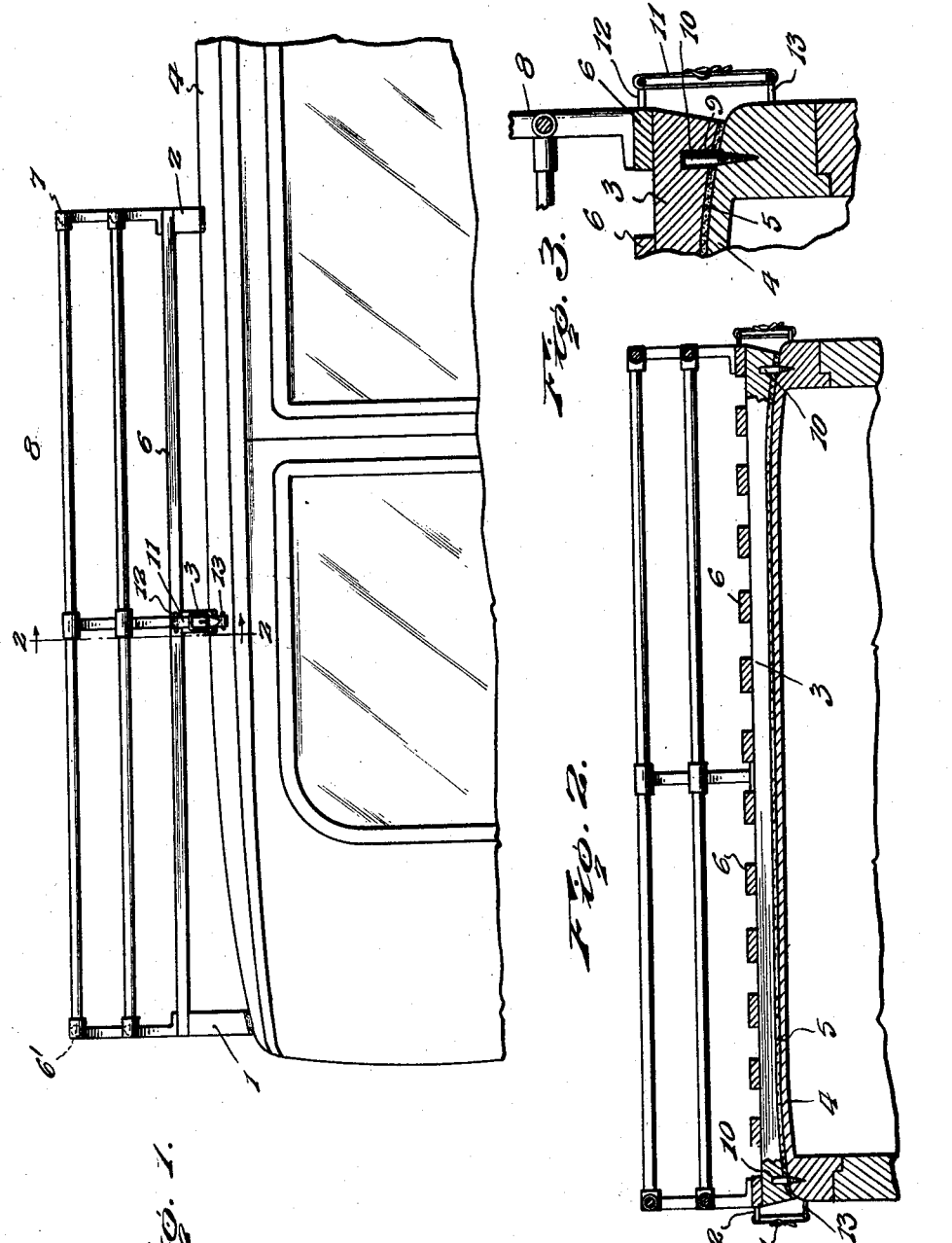

Patented Jan. 17, 1933

1,894,482

UNITED STATES PATENT OFFICE

MELVIN D. DORSEY, OF WALDPORT, OREGON

LUGGAGE CARRIER

Application filed May 8, 1929. Serial No. 361,467.

The present invention is directed to improvements in luggage carriers adapted for application to the top of an automobile of the closed type.

The primary object of the invention is to provide a device of this character which can be easily and quickly placed upon the top of a motor vehicle and secured thereon against accidental displacement, and can be readily removed when not needed.

Another object of the invention is to provide a device of this character which is simple in construction, durable, efficient in operation, and one which can be manufactured at a very small cost.

Another object of the invention is to provide a rack or carrier, the construction of which is such that it will be maintained in proper position and will not mar or injure the top when in position thereon.

With these and other objects in view, this invention resides in the novel features of construction, formation, combination and arrangement of parts to be hereinafter more fully described, claimed and illustrated in the accompanying drawings, in which:

Figure 1 is a fragmentary side view of a motor vehicle showing the carrier in place thereon.

Figure 2 is a sectional view on line 2—2 of Figure 1.

Figure 3 is an enlarged detail sectional view.

Figure 4 is a fragmentary plan view of an automobile top, showing the carrier in place thereon.

The carrier comprises front and rear sills 1 and 2 respectively, and an intermediate sill 3, said sills having their lower edges shaped to conform to the transverse formation of an automobile top 4, and in order to prevent scratching or marring of the top, strips of felt 5 are secured to the under surfaces of the respective sills.

Slats 6 are supported by the sills 1, 2 and 3 and constitute a bottom for the carrier, said carrier further including front and rear rails 6' and 7 respectively, and side rails 8—8, said rails being preferably formed from metal tubing.

The intermediate sill 3 has formed near its ends, sockets 9, which are adapted to receive pins 10, said pins, in this instance, being threaded in the top 4, as most clearly shown in Figure 3 of the drawings. In case the top of the vehicle is formed from sheet metal, the pins may be welded or otherwise suitably secured thereto. It will be obvious that when the carrier is in place, the pins will be engaged in the sockets 9, whereby the carrier will be held against slipping upon the top of the vehicle.

To prevent movement or dislodgment of the carrier, due to shocks incident to the vehicle encountering road obstructions, straps 11 are employed and are engaged in the loops 12 and 13, carried respectively by the carrier and vehicle top. When the straps 11 are tightened, likelihood of the carrier being accidentally disengaged is positively prevented, but when it is desired to remove the carrier the straps are released and the carrier can be lifted from engagement with the pins 10.

A tarpaulin or other suitable type of covering may be placed over the carrier to protect the contents against dust and moisture.

It will be observed that the sills vary in height so that when the carrier is in place upon the vehicle top the slatted bottom thereof will be disposed in a horizontal plane.

From the foregoing, it is thought that the operation and many advantages of the herein described invention will be apparent to those skilled in the art without further description and it will be understood that various changes in the size, shape, proportions, material, and minor details of construction may be resorted to without departing from the spirit or sacrificing any of the advantages of the invention.

What is claimed is:

A luggage carrier adapted to be supported on the roof of a motor vehicle comprising a plurality of transversely disposed sills having their top edges in the same plane and having their lower edges conforming to the longitudinal and transverse camber of the roof for which the carrier is designed, longitudinal slats connecting the sills and in contact with the top edges thereof, a railing extending upwardly around the sides of the carrier, one of said sills having sockets near its ends opening through its under face, pins having threaded lower ends to be screwed into the roof of the vehicle and unthreaded upper portions for engagement in the sockets to prevent shifting of the carrier upon the roof of the vehicle, vertically spaced loops extending from the rail and body of the vehicle, respectively, at each pin, and fastening straps connecting said loops for holding the carrier in position on the roof of the vehicle and retaining the pins in their sockets.

In testimony whereof I affix my signature.

MELVIN D. DORSEY. [L. S.]